（12） United States Patent
Lai et al.

(10) Patent No.: US 12,492,556 B2
(45) Date of Patent: Dec. 9, 2025

(54) ROOFING SHINGLES, TILES AND SHAKES

(71) Applicant: CertainTeed LLC, Malvern, PA (US)

(72) Inventors: Choung-Houng Lai, Acton, MA (US); Mithun N. Kamath, Shrewsbury, MA (US); Jia Liu, Northborough, MA (US); Liyan Ma, King of Prussia, PA (US); Gregory F. Jacobs, Oreland, PA (US)

(73) Assignee: CERTAINTEED LLC, Malvern, PA (US)

( * ) Notice: Subject to any disclaimer, the term of this patent is extended or adjusted under 35 U.S.C. 154(b) by 0 days.

(21) Appl. No.: 17/741,132

(22) Filed: May 10, 2022

(65) Prior Publication Data
US 2023/0029878 A1 Feb. 2, 2023

Related U.S. Application Data

(63) Continuation of application No. 17/099,211, filed on Nov. 16, 2020, now Pat. No. 11,326,348, which is a
(Continued)

(51) Int. Cl.
E04D 1/20 (2006.01)
B32B 5/18 (2006.01)
(Continued)

(52) U.S. Cl.
CPC .................. E04D 1/20 (2013.01); B32B 5/18 (2013.01); B32B 5/30 (2013.01); B32B 7/12 (2013.01);
(Continued)

(58) Field of Classification Search
CPC .. E04D 1/20; E04D 5/02; E04D 7/005; E04D 2001/005; E04D 1/26; B32B 5/18; B32B 5/30; B32B 7/12; B32B 27/065; B32B 27/14; B32B 27/20; B32B 27/304; B32B 27/308; B32B 27/40; B32B 2419/06; B32B 2262/0269; B32B 5/16; B32B 2255/205; B32B 2262/101; B32B 2262/14; B32B 5/028; B32B 5/26; B32B 2262/0276; B32B 2262/103; B32B 2264/104; B32B 2266/08; B32B 2307/72; B32B 5/32;
(Continued)

(56) References Cited

U.S. PATENT DOCUMENTS 3,899,855 A 8/1975 Gadsby
5,010,116 A 4/1991 Colafati
(Continued)

Primary Examiner — Nathan L Van Sell
(74) Attorney, Agent, or Firm — Abel Schillinger, LLP; Stephen Eland

(57) ABSTRACT

The present disclosure relates generally to roofing elements and methods for making them. In one embodiment, the disclosure provides a roofing element in the form of a roofing shingle that includes a body of a foamed cured cross-linked polymer, the body having a top surface and a bottom surface, the body extending substantially in a plane and having a thickness in the range of 0.5 mm to 35 mm; and a layer of weather-resistant roofing granules disposed on and adhered at the top surface of roofing element. The roofing element can be made by providing a body of wet foamed curable composition, and allowing the curable composition to cure to provide the body of foamed cured cross-linked polymer.

20 Claims, 9 Drawing Sheets

Related U.S. Application Data continuation of application No. 15/857,531, filed on Dec. 28, 2017, now Pat. No. 10,837,176.

(60) Provisional application No. 62/441,196, filed on Dec. 31, 2016.

(51) Int. Cl.
*B32B 5/30* (2006.01)
*B32B 7/12* (2006.01)
*B32B 27/06* (2006.01)
*B32B 27/14* (2006.01)
*B32B 27/20* (2006.01)
*B32B 27/30* (2006.01)
*B32B 27/40* (2006.01)
*E04D 5/02* (2006.01)
*E04D 7/00* (2006.01)

(52) U.S. Cl.
CPC ............ *B32B 27/065* (2013.01); *B32B 27/14* (2013.01); *B32B 27/20* (2013.01); *B32B 27/304* (2013.01); *B32B 27/308* (2013.01); *B32B 27/40* (2013.01); *E04D 5/02* (2013.01); *E04D 7/005* (2013.01); *B32B 2419/06* (2013.01)

(58) Field of Classification Search
CPC ........ B32B 2264/101; B32B 2264/102; B32B 2307/3065; B32B 27/32; B32B 27/36; B32B 29/04; B32B 2250/03; B32B 2255/10; B32B 2260/021; B32B 2264/10; B32B 3/26; B32B 5/245; B32B 2260/04; B32B 2262/0253; B32B 2266/0235; B32B 2266/0242; B32B 2266/0264; B32B 2266/0278; B32B 2307/4026; B32B 2307/5825; B32B 2307/712; B32B 2307/7265; B32B 2307/732; B32B 29/007
See application file for complete search history.

(56) References Cited

U.S. PATENT DOCUMENTS

| | | |
|---|---|---|
| 5,462,623 A | 10/1995 | Day |
| 5,813,176 A | 9/1998 | Tzeng |
| 5,837,363 A | 11/1998 | Colafati |
| 7,125,601 B1 | 10/2006 | Pinault et al. |
| 8,668,988 B2 | 3/2014 | Schoots |
| 10,837,176 B2 | 11/2020 | Lai |
| 11,326,348 B2 | 5/2022 | Lai |
| 2003/0198736 A1* | 10/2003 | Fensel ................ B32B 5/16 427/180 |
| 2007/0066216 A1* | 3/2007 | McIntire ............ E04D 1/08 454/365 |
| 2007/0148340 A1 | 6/2007 | Kalkanoglu et al. |
| 2007/0148342 A1 | 6/2007 | Kalkanoglu et al. |
| 2008/0118640 A1 | 5/2008 | Kalkanoglu et al. |
| 2008/0131664 A1 | 6/2008 | Teng et al. |
| 2008/0207787 A1* | 8/2008 | Clatty ............ C08G 18/4018 521/137 |
| 2011/0189465 A1 | 8/2011 | Maurer et al. |
| 2011/0293914 A1 | 12/2011 | Maurer et al. |
| 2012/0276369 A1 | 11/2012 | Jing et al. |
| 2013/0202852 A1 | 8/2013 | Shiao et al. |
| 2015/0099411 A1 | 4/2015 | Yang et al. |

* cited by examiner (a)

(b)

ROOFING SHINGLES, TILES AND SHAKES

CROSS-REFERENCE TO RELATED APPLICATIONS

This application is a continuation of U.S. patent application Ser. No. 17/099,211, which is a continuation of U.S. patent application Ser. No. 15/857,531, filed Dec. 28, 2017, which claims the benefit of priority of U.S. Patent Application No. 62/441,196, filed Dec. 31, 2016, each of which is hereby incorporated herein by reference in its entirety.

BACKGROUND OF THE DISCLOSURE

1. Field of the Disclosure

The present disclosure relates generally to asphalt-free roofing elements and methods for making them. The present disclosure relates more particularly to roofing elements that comprise foamed cured cross-linked polymer, such as polyacrylate-based polymers.

2. Technical Background

The vast majority of home roofing is done with either an asphalt shingle or a wood shingle, with the asphalt shingle having significant cost, service life, and flammability advantages over the wood shingle. But asphalt shingles have several disadvantages as well. Although initially cost-effective in nature, the lifespan of asphalt shingles lifespan decreases requiring re-roofing every 10-20 years and thus increasing the overall costs over the life of the roof structure. In addition, asphalt shingles incur granule loss, cracking, curling, and cupping, particularly with longer (e.g., years) exposure to UV and climatic conditions. In addition, asphalt shingles can easily be damaged by hail storms, high winds, and other natural causes.

Moreover, weight is an important factor for roofing materials. Asphalt is a relatively dense material, and so asphalt-based shingles typically have a relatively high mass per unit area, on the order of 3 lb/ft$^2$. Such heavy shingles not only require relatively strong underlying roof surfaces, but are also relatively expensive to transport. And heavy shingles are much more difficult for a roofer, both from the standpoint of carrying the shingles up to the roof and the standpoint of arranging shingles once on the roof.

Asphalt is black, and absorbs a great deal of radiation (e.g., visible and infrared solar radiation), which can cause asphalt shingle-clad roofs to heat up considerably, especially during the summer. The use of white-colored or even solar-reflective roofing granules can ameliorate the heat absorption to some extent. However, granules will generally not provide absolute coverage of the asphalt surface, and thus a considerable amount of radiation will remain even when reflective granules are used.

There remains a need for improved roofing elements that address the drawbacks of the asphalt shingles. Also considering the steady increase in cost and price of raw asphalt materials, there is a need for development of cost-effective roofing elements.

SUMMARY OF THE DISCLOSURE

The present inventors have found simple and cost-efficient roofing elements that are asphalt-free but can have the appearance of asphalt shingles with improved function over the asphalt shingles.

Thus, in one aspect, the present disclosure provides a roofing element in the form of a roofing shingle, shake or tile extending substantially in a plane, the roofing element having a top surface, the roofing element including:
  a body of a foamed cured cross-linked polymer, the body having a top surface and a bottom surface, the body extending substantially in the plane and having a thickness in the range of 0.5 mm to 35 mm; and
  a layer of weather-resistant roofing granules disposed on and adhered at the top surface of the roofing element.

In certain embodiments of the roofing elements as otherwise described herein, the polymer is a polyacrylate-based polymer, derived from one or more monomers including a polymerizable acrylic or methacrylic group. The polyacrylate-based polymer can be, for example, a polyurethane/acrylic hybrid, for example, one in which acrylate- or methacrylate-terminated polyurethanes are used as monomers.

Of course, other types of cross-linked polymers can be used. For example, in other embodiments of the roofing elements as otherwise described herein, the polymer is a polyurethane. And in other embodiments of the roofing elements as otherwise described herein, the polymer is a polymer or copolymer of vinylidene fluoride. Combinations of polymers can also be used.

In certain embodiments of the roofing elements as otherwise described herein, the roofing granules are disposed on and adhered to the top surface of the body of foamed cured cross-linked polymer itself. However, other configurations are possible, e.g., in which an adhesive is used to adhere the granules to the top surface of the body of foamed cured cross-linked polymer, and in which an adhesive is used to adhere the granules to a polymer film that is disposed on the top surface of the body of foamed cured cross-linked polymer, as further described herein.

Another aspect of the present disclosure provides an array of the roofing elements of the disclosure disposed on a roof deck.

Yet another aspect of the present disclosure provides a process for preparing a roofing element of the disclosure including:
  providing a wet body of a foamed curable composition, the foamed curable composition being adapted to provide the foamed cured cross-linked polymer upon curing, the foamed curable composition having a wet foam density of about 0.1 to about 1.0 g/mL to provide a wet roofing element precursor;
  allowing the wet roofing element precursor to cure to provide the body of foamed cured cross-linked polymer.

In various embodiments, weather-resistant roofing granules can be applied at the top surface of the body of foamed cured cross-linked polymer. For example, in certain embodiments, the weather-resistant granules are disposed on a top surface of the wet body of the foamed curable composition, such that they adhere to the top surface of the body of foamed cured cross-linked polymer when it is cured. In other embodiments, a separate adhesive layer can be used to adhere roofing granules to a top surface of the roofing element, e.g., either before or after the wet roofing element precursor is cured.

Additional aspects of the disclosure will be evident from the disclosure herein.

BRIEF DESCRIPTION OF THE DRAWINGS

The accompanying drawings are included to provide a further understanding of the methods and devices of the disclosure, and are incorporated in and constitute a part of this specification. The drawings are not necessarily to scale, and sizes of various elements may be distorted for clarity. The drawings illustrate one or more embodiment(s) of the disclosure, and together with the description serve to explain the principles and operation of the disclosure.

DETAILED DESCRIPTION

Figure 1:
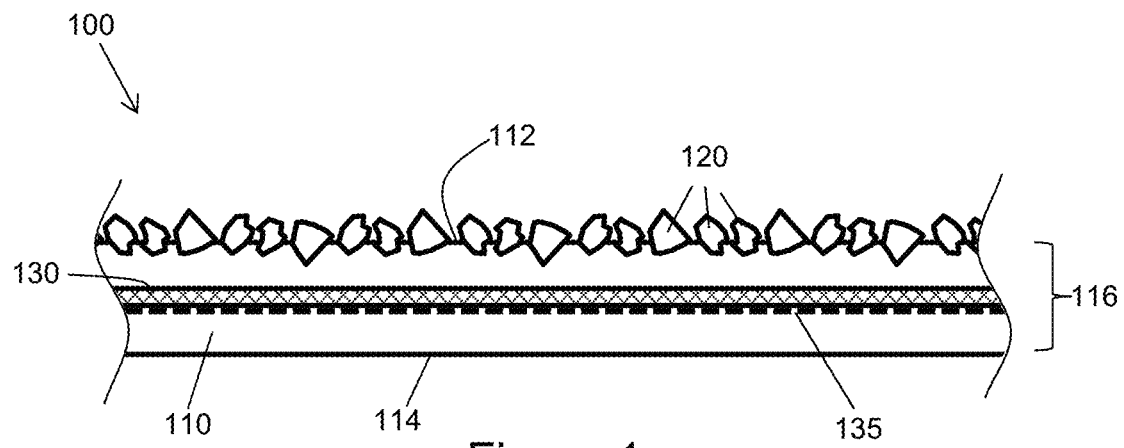
FIG. 1 is a partial schematic cross-sectional view.

Before the disclosed processes and materials are described, it is to be understood that the aspects described herein are not limited to specific embodiments, apparati, or configurations, and as such can, of course, vary. It is also to be understood that the terminology used herein is for the purpose of describing particular aspects only and, unless specifically defined herein, is not intended to be limiting.

Throughout this specification, unless the context requires otherwise, the word "comprise" and "include" and variations (e.g., "comprises," "comprising," "includes," "including") will be understood to imply the inclusion of a stated component, feature, element, or step or group of components, features, elements or steps but not the exclusion of any other integer or step or group of integers or steps.

As used in the specification and the appended claims, the singular forms "a," "an" and "the" include plural referents unless the context clearly dictates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

All percentages, ratios and proportions herein are by weight, unless otherwise specified.

In view of the present disclosure, the processes and active materials described herein can be configured by the person of ordinary skill in the art to meet the desired need. In general, the disclosed materials, methods, and apparati provide improvements in roofing elements (e.g., roofing shingles). The roofing elements of the disclosure are simple and cost-efficient, and can eliminate or substantially reduce the use of asphalt. The present inventors have determined that using a body of a foamed cured cross-linked polymer in the construction of the roofing element can afford the appearance of asphalt shingles while providing improved function over the asphalt shingles. The roofing elements of the present disclosure are made from polymeric materials, and, given the increasing prices and degree of environmental regulation attendant asphalt materials, can therefore be made at substantially reduced cost as compared to asphalt shingles. Moreover, the roofing elements of the disclosure are made from foamed polymer, and can, in certain embodiments, be considerably lighter than asphalt shingles. And as the foamed polymers can be made to be substantially white, they absorb much less radiation than asphalt materials, and thus will heat up much less when disposed on a roof in direct sunlight. The roofing elements of the present disclosure can, despite being made from a different material than asphalt, maintain many of the desired properties of asphalt shingles. For example, the roofing elements of the disclosure can in certain embodiments, despite being foamed, resist water (for example, certain Example roofing elements did not absorb any water after a 2 h exposure, and showed only minimal absorbance after 12 h exposure). Further, the roofing elements of the disclosure have been made to have good flame retardancy, sufficient to pass the ASTM E-84 flame spray test. Finally, in certain embodiments (e.g., when a glass mesh is present as described herein), the roofing elements of the disclosure can have acceptable tear strength. The foam density and morphology of the cured cross-linked polymer can be easily controlled, for example with use of specific surfactants and mixing conditions, thus affording the roofing elements with particular mechanical properties based on the needs of roofing applications.

Thus, one aspect of the disclosure provides roofing elements in the form of a roofing shingle, tile or shake extending substantially in a plane, the roofing element having a top surface, the roofing element including:
 a body of a foamed cured cross-linked polymer, the body having a top surface and a bottom surface, the body extending substantially in the plane and having a thickness in the range of 0.5 mm to 35 mm; and
 a layer of weather-resistant roofing granules disposed on and adhered at the top surface of the roofing element.

Figure 2:
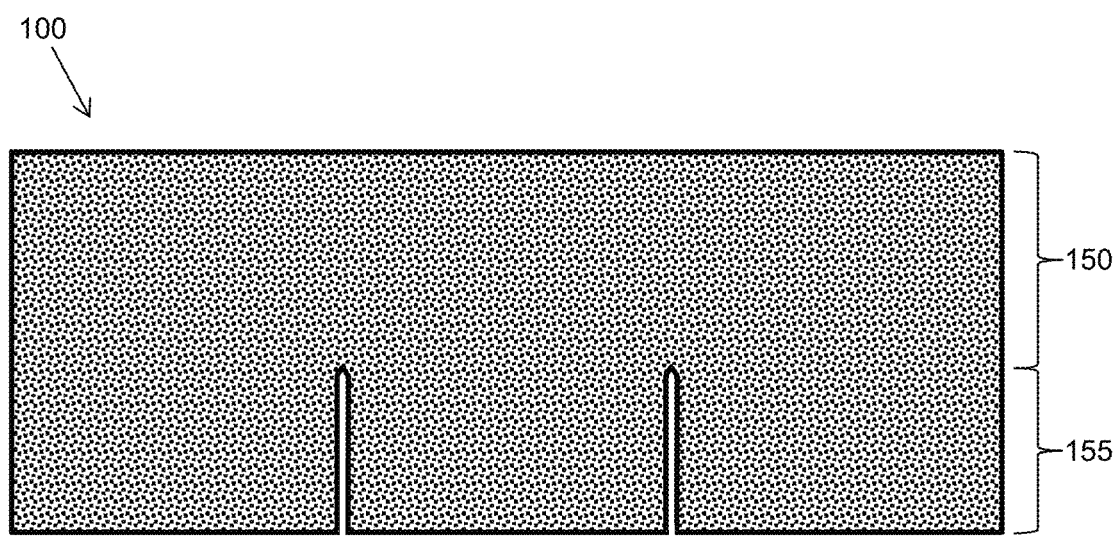
FIG. 2 is a schematic plan view of a roofing element according to one embodiment of the disclosure.

One embodiment of such a roofing element is shown in partial schematic cross-sectional view in FIG. 1, and in schematic plan view in FIG. 2. Here, roofing element 100 is in the form of a shingle—in this embodiment, a three-tab shingle as is common in the roofing arts. Roofing element 100 includes a body of foamed cured cross-linked polymer 110. The body 110 has a top surface 112 and bottom surface 114. The body extends substantially in a plane, and has a thickness (indicated by reference numeral 116) in the range of 2 mm to 25 mm. Disposed on and adhered to the top surface of the body of foamed cured cross-linked polymer is a layer of weather-resistant roofing granules 120.

In certain embodiments as otherwise described herein, the roofing elements of the disclosure are essentially asphalt-free. The term "essentially free" as used herein means that less than about 15 wt %, or less than about 10 wt %, or less than about 7 wt %, or less than about 5 wt %, or less than about 4 wt %, or less than about 3 wt %, or less than about 2 wt %, or less than about 1.5 wt %, or less than about 1 wt %, or less than about 0.5 wt %, or less than about 0.2 wt %, or less than about 0.1 wt %, or about 0 wt % of total body of the roofing element is asphalt. In certain embodiments, a thin layer of asphalt may be used as, for example, a backing layer at the bottom surface of the body of foamed polymer. And in other embodiments, thin strips of uncoated asphalt (or, of course, other adhesive materials) may be used to provide for adhesion to overlying roofing elements. Such sealant strips can be, for example, on the top surface in a headlap portion of the roofing element, or on the bottom surface at the lower edge of the roofing element. The sealant strip can be provided, e.g., in single or double continuous or discontinuous lines, as is familiar to the person of ordinary skill in the art. But in other embodiments, substantially no asphalt layer or asphalt material is present in the roofing element.

In certain embodiments of the roofing elements as otherwise described herein, the roofing element includes a support sheet disposed at least partially within the body of foamed polymer. For example, roofing element 100 of FIG. 1 includes a support sheet 130, extending substantially throughout the plane of the roofing element. Notably, the support sheet 130 subdivides the body of foamed polymer into two non-contiguous parts, but nonetheless the body of foamed polymer is considered to include both the foamed polymer above the support sheet and the foamed polymer below the support sheet. The support sheet can, for example, provide mechanical support to the body of foamed polymer, e.g., to increase the rigidity and tear strength thereof. However, as the person of ordinary skill in the art will appreciate, in certain embodiments of the roofing elements as otherwise described herein, it is desirable for the roofing element to remain somewhat flexible, e.g., like conventional asphalt shingles. Accordingly, it is desirable that the support sheet not make the roofing element too rigid.

In certain embodiments of the roofing elements as otherwise described herein, the support sheet is a fibrous mat, e.g., of metallic strands, of polymeric fibers (such as polyester, aramid, or polyolefin fibers), of glass fibers, or of a combination thereof. In certain embodiments of the roofing elements as otherwise described herein, the support sheet is a fiberglass mat. In certain embodiments of the roofing elements as otherwise described herein, the support sheet is a sheet of roofing felt. When the support sheet is porous, e.g., as in a fiberglass mat or a roofing felt, the foamed polymer can be impregnated into the pores of the support sheet.

Figure 3:
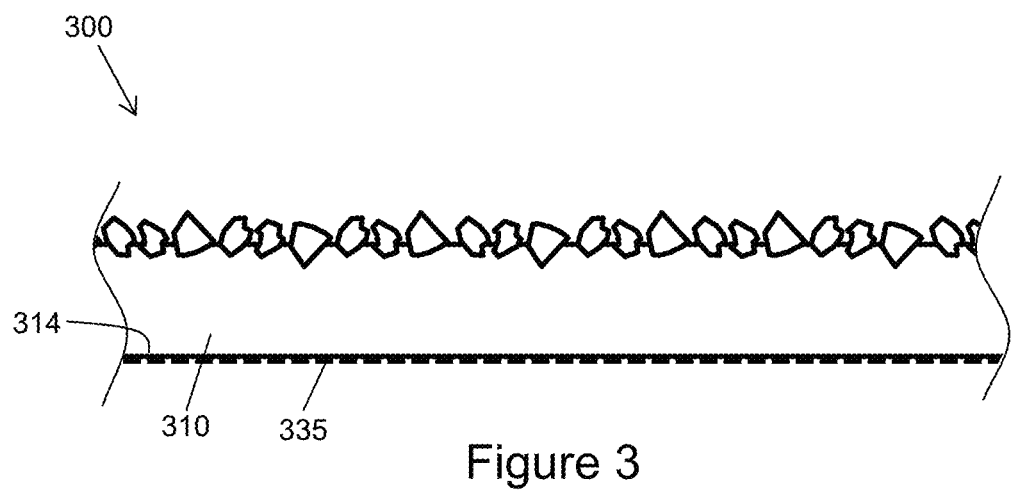
FIG. 3 is a partial schematic cross-sectional view of a roofing element according to another embodiment of the disclosure.

In certain embodiments as otherwise described herein, the roofing element includes a mesh sheet. The mesh sheet can have a minimum mesh size of, e.g., 1 mm×1 mm, 2 mm×2 mm, 5 mm×5 mm, or 10 mm×10 mm. The mesh sheet can be made, for example, from glass fiber, metal fiber, or polymeric fibers, and can help provide acceptable tear strength to the roofing element. The mesh sheet can be disposed, for example, at least partially within the body of foamed cured cross-linked polymer. For example, roofing element 100 of FIG. 1 includes a mesh sheet 135 disposed within the body of foamed polymer, in this embodiment, up against the support sheet. Of course, the mesh sheet need not be disposed in contact with a support sheet. In other embodiments as otherwise described herein, the roofing element includes a mesh sheet disposed on the bottom surface of the body of foamed cured cross-linked polymer. This is shown in the partial cross-sectional view of FIG. 3. Roofing element 300 includes a mesh sheet 335 (e.g., a glass mesh with a mesh size of at least 5 mm×5 mm) disposed at the bottom surface 314 of body of foamed polymer 310. And, as shown in FIG. 3, a mesh sheet can be used even in the absence of a support sheet.

Figure 4:
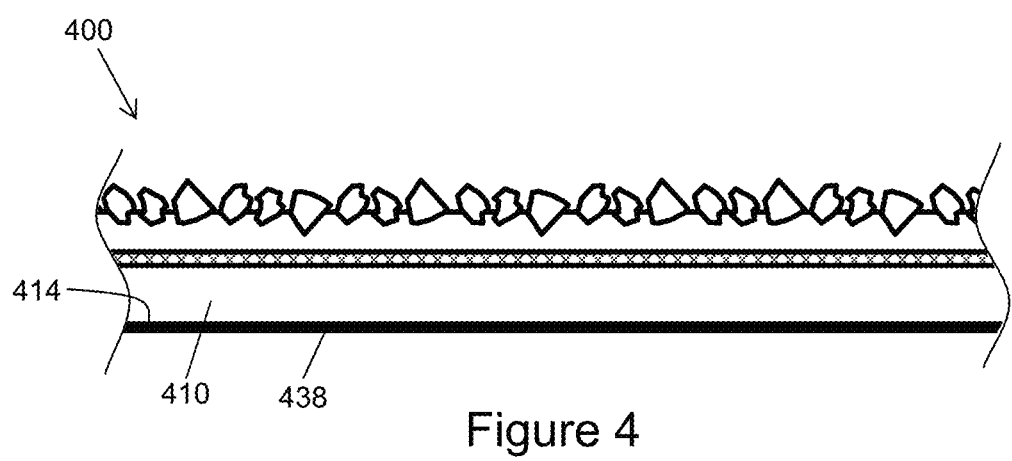
FIG. 4 is a partial schematic cross-sectional view of a roofing element according to another embodiment of the disclosure.

In certain embodiments as otherwise described herein, the roofing element includes a backing sheet disposed on the bottom surface of the body of foamed cured cross-linked polymer. The backing sheet can be helpful, for example, during manufacture of the roofing element, to provide a surface on which a wet foamed curable composition can be disposed, as described below. This is shown in the partial cross-sectional view of FIG. 4. Roofing element 400 includes a backing sheet 438 disposed at the bottom surface 414 of body of foamed polymer 410. The backing sheet can be, for example, a polymer film (e.g., poly(ethylene terephthalate, polypropylene, high-density polyethylene), or a paper sheet. The backing sheet can, for example, be an integral part of the construction of the roofing element, e.g., in cases where the foamed curable composition is dispensed onto the backing sheet during manufacture. The backing sheet can provide additional functionality, such as water barrier properties and reflection of infrared radiation (e.g., through use of a metallized film).

Figure 5:
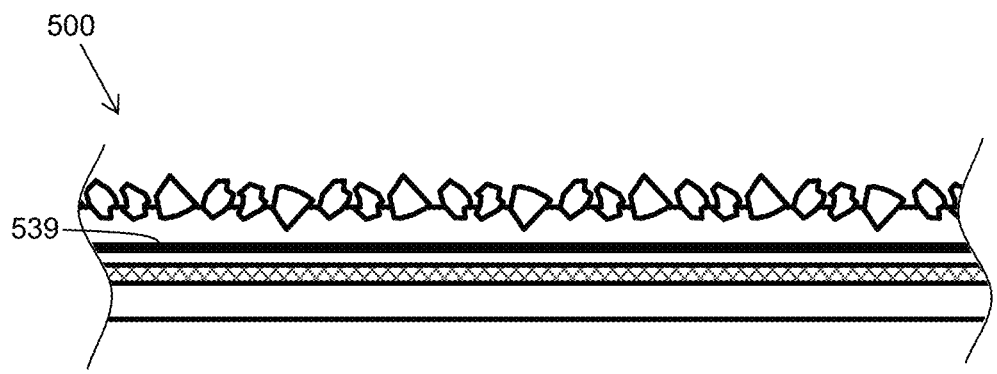
FIG. 5 is a partial schematic cross-sectional view of a roofing element according to another embodiment of the disclosure.

In certain embodiments as otherwise described herein, the roofing element includes a polymer film disposed within the body of foamed cured cross-linked polymer. This is shown in the partial schematic cross-sectional view of FIG. 5. Roofing element 500 includes a polymer film 539 disposed within the body of foamed polymer 510. Such a film can be, e.g., a polymer film (e.g., poly(ethylene terephthalate, polypropylene, high-density polyethylene), and can provide not only mechanical support for the body of foamed polymer, but can also provide additional functionality, such as water barrier properties and reflection of infrared radiation (e.g., through use of a metallized film).

Figure 6:
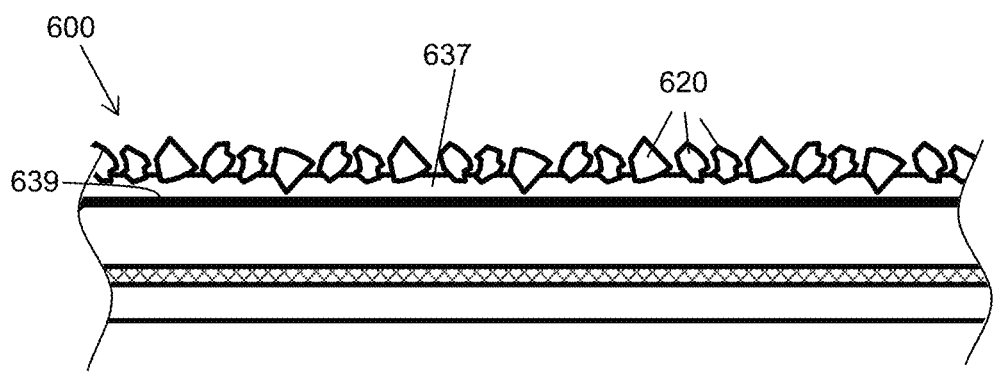
FIG. 6 is a partial schematic cross-sectional view of a roofing element according to another embodiment of the disclosure.

In certain embodiments of the roofing elements as otherwise described herein, the roofing element includes a polymer film disposed on the top surface of the body of foamed cured cross-linked polymer. Such an embodiment is shown in partial schematic cross-sectional view in FIG. 6. Here, roofing element 600 includes a polymer film 639 disposed at the top surface of the body of foamed polymer. In one particular such embodiment, the polymer film 639 is metallized, so that it can provide for a high degree of reflection of infrared radiation. An adhesive 637 adheres the granules 620 at the top surface of the roofing element. Any suitable adhesive can be used to adhere the granules.

As described above, one advantage of the foamed polymer materials described herein is that they can be made to be substantially lighter than asphalt materials. In certain embodiments of the roofing elements as described herein, the body of foamed cured cross-linked polymer has a density in the range of 1 g/mL to 2 g/mL, as measured by pycnometer. In various embodiments, the body of foamed cured cross-linked polymer has a density in the range of 1.2 g/mL to 2 g/mL, or 1.4 g/mL to 2 g/mL, or 1 g/mL to 1.8 g/mL, or 1.2 g/mL to 1.8 g/mL, or 1.4 g/mL to 1.8 g/mL, or 1 g/mL to 1.6 g/mL, or 1.2 g/mL to 1.6 g/mL, or 1.4 g/mL to 1.6 g/mL.

In certain embodiments of the roofing elements as otherwise described herein, the body of foamed cured cross-linked polymer has a void volume in the range of 40-70%, e.g., in the range of 45-70%, or 50-70%, or 40-65%, or 45-65%, or 50-65%, or 40-60%, or 45-60%, or 50-60%. Void volume can be measured by CAT scan.

Figure 7:
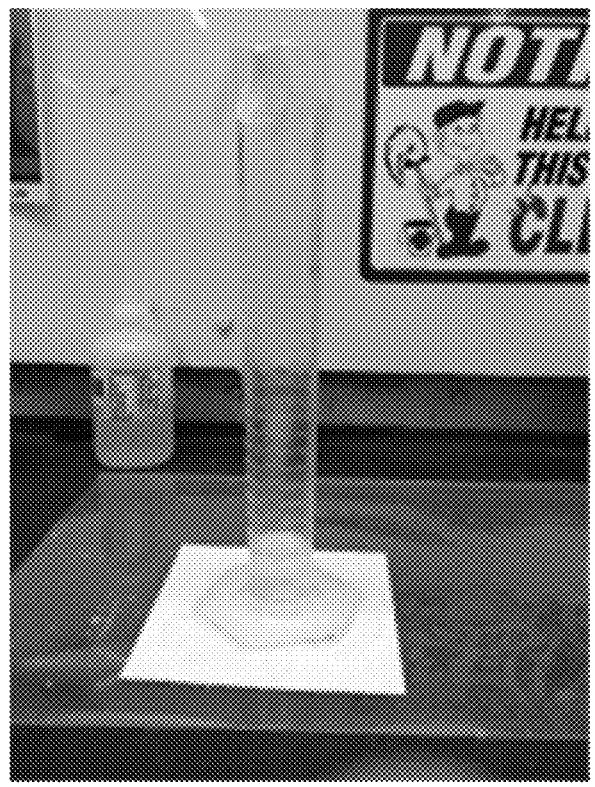
FIG. 7 is a photograph of a testing apparatus for determining water absorption.

In certain embodiments of the roofing elements as otherwise described herein, the body of foamed cured cross-linked polymer is in the form of a substantially closed-cell foam. A closed-cell foam can be desirable, because it can provide light weight in combination with water resistance. In certain embodiments, the body of foamed polymer (i.e., as measured with a layer of granules disposed thereon and adhered thereto) has a water absorbance of less than 0.5 mL or even less than 0.2 mL after 2 hours. The water absorbance is determined as follows: a 6"×6" square of foamed polymer with granules is provided, and a 500 mL graduated cylinder (inner diameter ~0.108 inch). with a hole in the bottom (~0.108 inch in diameter) is fastened to the top surface of the foamed polymer using silicone caulk. Water is added to 100 mL, and the top of the graduated cylinder is covered to substantially prevent evaporation of water. After 2 hours, the amount of water remaining in the graduated cylinder is measured. A picture of the measurement apparatus is provided as FIG. 7.

In certain embodiments of the roofing elements as otherwise described herein, the body of foamed cured cross-linked polymer has a void volume, and no more than 20% (e.g., no more than 10%, no more than 5%, or even no more than 2%) of the void volume is formed by foam cells having a longest dimension in excess of 100 microns. In certain such embodiments, the body of foamed cured cross-linked polymer has a void volume, and no more than 20% (e.g., no more than 10%, no more than 5%, or even no more than 2%) of the void volume is formed by foam cells having a longest dimension in excess of 80 microns.

The body of foamed cured cross-linked polymer described herein can be provided with a variety of different cell sizes. For example, in certain embodiments of the roofing elements as otherwise described herein, the body of foamed cured cross-linked polymer has an average cell size of about 10 to about 300 µm, or about 10 to about 200 µm, or about 10 to about 100 µm, or about 10 to about 80 µm, or about 10 to about 60 µm, or about 20 to about 300 µm, or about 20 to about 200 µm, or about 20 to about 100 µm, or about 20 to about 80 µm, or about 20 to about 60 µm, or about 30 to about 300 µm, or about 30 to about 200 µm, or about 30 to about 100 µm, or about 30 to about 80 µm, or about 30 to about 60 µm, or about 30 to about 55 µm, or about 30 to about 50 µm, or about 35 to about 50 µm. The person of ordinary skill in the art can, in view of the methods described herein, provide a desired cell size to a body of foamed cured cross-linked polymer. The distribution of cell sizes need not be unimodal; the body of foamed cured cross-linked polymer can have a multimodal cell distribution. And the distribution of cell sizes need not be continuous throughout the body of foamed polymer. For example, the body of foamed polymer can have a first cell size distribution towards its top surface and a second cell size distribution towards its bottom surface (e.g., one cell size distribution on one side of a support sheet and another cell size distribution on the other side of the support sheet).

In certain embodiments, the polymer of the foamed polymer body is a polyacrylate-based polymer, derived from one or more monomers including a curable acrylic or methacrylic group. Such polymers can contain, in combination with (meth)acrylic monomer(s), other ethylenically unsaturated monomers that can copolymerize with the (meth) acrylic monomers. (e.g., styrene, vinyl acetate, vinyl chloride). For example, the polymer can be an polyurethane/acrylate hybrid, e.g., in which one of the acrylate monomers is a (meth)acrylate-terminated polyurethane. Acrylic materials can be especially advantageous in that they can have high weatherability, are generally non-discoloring, and are attractive from cost and environmental safety and health perspectives. The amount of (meth)acrylic-based monomer and polymer in such materials is at least 50 wt %, at least 70 wt %, or even at least 90 wt % on a cured weight basis.

The person of ordinary skill in the art will appreciate that a variety of acrylic polymers can be used. For example, water-borne acrylic latexes can be used, such as those available under the Rhoplex® trade name or under the Avicor® trade name. The person of ordinary skill in the art will appreciate that other cross-linkable acrylic materials can be used. The person of ordinary skill in the art will, based on the present disclosure, select polymers and precursor materials with a desirably low glass transition temperature and of a desirable viscosity to allow a foam to be created and supported.

In certain embodiments of the roofing elements as otherwise described herein, the one or more monomers from which the cross-linked polyacrylate is derived comprise one or more of acrylic acid, methacrylic acid, acrylic acid esters, methacrylic acid esters, acrylamide, methacrylamide, N-(hydroxymethyl)acrylamide, N-(hydroxyethyl)acrylamide, 2-hydroxypropyl methacrylamide, N-acryloylamido-ethoxyethanol, diacetone acrylamide, acetoacetoxyethyl (meth)acrylate, N-methylolacrylamide, hydroxyethyl (meth)acrylate, itaconic acid or a combination thereof. For example, in certain such embodiments, the one or more monomers include N-(hydroxymethyl)acrylamide.

In certain embodiments of the roofing elements as otherwise described herein, the one or more monomers from which the cross-linked polyacrylate is derived include a carboxylate-bearing monomer. Suitable carboxylate-bearing monomers include, e.g., acrylic acid, methacrylic acid, maleic anhydride (e.g., in hydrolyzed form), itaconic acid. Carboxylate-bearing monomers can be desirable in that they can be cross-linked by zinc or zirconium, or by glyoxal.

In certain embodiments of the roofing elements as otherwise described herein, the one or more monomers from which the cross-linked polyacrylate is derived include a hydroxyl-, amine-, or amide-bearing monomer. Suitable carboxylate-bearing monomers include, e.g., methacrylamide, N-(hydroxymethyl)acrylamide, N-(hydroxyethyl)acrylamide, 2-hydroxypropyl methacrylamide, diacetone(meth) acrylamide, acetoacetoxyethyl (meth)acrylate and N-acryloylamido-ethoxyethanol. Hydroxyl-, amine-, or amide-bearing monomers can be desirable in that they can be cross-linked by glyoxal.

In certain embodiments of the roofing elements as otherwise described herein, the one or more monomers from which the cross-linked polyacrylate is derived include an acrylic or methacrylic silane coupling agent. Silane coupling agents can be useful to help provide adhesion between the body of foamed polymer and the roofing granules. A variety of silane coupling agents are familiar to the person of ordinary skill in the art, such as 3-(trimethoxysilyl)propyl acrylate, 3-(trimethoxysilyl)propyl methacrylate, 3-(triethoxysilyl)propyl acrylate, and 3-(triethoxysilyl)propyl methacrylate. Zirconate and/or titanate coupling agents may also be used.

In other embodiments of the roofing elements as otherwise described herein, the foamed polymer body can be made from polymer materials other than acrylate-based polymers. For example, in other embodiments, the polymer of the foamed polymer body is a polyurethane, e.g., provided as a weatherable polyurethane dispersion. In other embodiments, the polymer of the foamed polymer body is polyvinylidine difluoride or a copolymer thereof, e.g., provided as a latex of polyvinylidene fluoride. Here, too, the person of ordinary skill in the art will select The person of ordinary skill in the art will, based on the present disclosure, select polymers and precursor materials with a desirably low glass transition temperature and of a desirable viscosity to allow a foam to be created and supported.

In certain embodiments of the roofing elements as otherwise described herein, the cross-linked polymer is covalently cross-linked (i.e., with covalent bonds between different polymer chains). The cross-linking can be by, for example, heat treatment to form condensation bonds between side chains of the different polymer chains, or by treatment with a cross-linking agent that reacts with functional groups on side chains of different polymer chains. For example, in certain embodiments, the cross-linked polymer is cross-linked by glyoxal residues. As the person of ordinary skill in the art will appreciate, glyoxal (HC(O)C(O)H) can react with carboxylate, amine, amide or alcohol moieties on different polymer chains to form a cross-link. In other embodiments, the cross-linked polymer is ionically cross-linked. The ionic cross-links can be, for example made by zinc ions. As the person of ordinary skill in the art will appreciate, zinc can form a cross-link with carboxylate residues on different polymer chains. In other embodiments, the ionic cross-links are made by zirconium ions. As the person of ordinary skill in the art will appreciate, zirconium can form a cross-link with carboxylate or hydroxyl residues on different polymer chains.

The body of foamed polymer can also include a number of additional additives. For example, in certain embodiments of the roofing elements as otherwise described herein, the body of foamed polymer includes one or more fillers. As the person of ordinary skill in the art will appreciate, fillers can not only take up space in the foamed polymer body and as such reduce the amount of expensive polymer to be used, but also can provide fire resistance. Fillers can be used, for example, in an amount up to 90% on a cured polymer basis. Examples of fillers include, without limitation, calcium carbonate, gypsum, stucco, dolomite, sand, glass powder, magnesium oxide, magnesium hydroxide, aluminum trihydrate; talc; kaolin, barium sulfate, wallastonite; optionally, colorants such as $TiO_2$, any common inorganic or organic pigments, or organic colorants; cool roof pigments can be included. Desired filler particle sizes are, for example, in the range of 8-60 microns.

In certain embodiments of the roofing elements as otherwise described herein, e.g., when a filler is present, the body of foamed polymer also includes a dispersant. The dispersant can help to finely disperse the filler in the polymer. A dispersant can be used, for example, in an amount, for example, (say, 0.1% to 20% on a cured polymer basis). Examples of dispersants include, without limitation, maleic anhydride copolymers and sodium salts thereof, e.g., available under the trade name Tamol 731, as well as other Tamol or Acumer brand dispersants from Dow Chemicals; aqueous dispersants such as those sold by BASF under the Efka and Dispex brands, by Evonik under the TEGO Dispers brand, by BYK, by Lubrizol, and by Air Products.

In certain embodiments of the roofing elements as otherwise described herein, the body of foamed polymer also includes one or more foaming auxiliaries. As described below, a curable composition can be beaten or whipped to create a foamed curable composition; the foaming auxiliaries can help to maintain the air cells in such a foamed curable composition until it cures into the body of foamed polymer. A variety of foaming auxiliaries can be used, e.g., succinate-based surfactants, such as those sold under the trade name STOKAL SR, ammonium stearate-based surfactants, such as those sold under the trade name STOKA STA, fatty acid derived linear surfactants, including their carboxylate analogs, sulfate analogs, ether-sulfate version, Cytec Acrysol OT, as well as other surfactants sold by, e.g., Stepan and BASF. Foaming auxiliaries can be used, for example, in an amount from 0.5-2 wt % on a cured polymer basis.

In certain embodiments of the roofing elements as otherwise described herein, the body of foamed polymer also includes an effective amount of one or more biocidal compounds. As used herein, a biocidal compound is a compound that substantially increases the resistance to growth of algae. The person of ordinary skill in the art will appreciate that a variety of algae-resistant additives can be used in the body of foamed polymer. Suitable algae-resistant additives include inorganic biocides such as copper, cuprous oxide, cupric acetate, cupric chloride, cupric nitrate, cupric oxide, cupric sulfate, cupric sulfide, cupric stearate, cupric cyanide, cuprous cyanide, cuprous stannate, cuprous thiocyanate, cupric silicate, cuprous chloride, cupric iodide, cupric bromide, cupric carbonate, cupric fluoroborate, zinc oxide, such as French process zinc oxide, zinc sulfide, zinc borate, zinc sulfate, zinc pyrithione, zinc ricinoleate, zinc stearate, zinc chromate, zinc carbonate, titanium oxide (such as the photocatalytic anatase), metallic silver, silver oxide, silver chloride, silver bromide, silver iodide and metal alloys (such as alloys of copper and silver, alloys of copper and zinc, and alloys of silver and zinc) and mixtures thereof. Organic biocides may also be used. referably, the organic biocide can include one or more compounds that are halogen based, nitrogen based, sulfur based, or phenolics. An exemplary halogen based organic biocide is 3-iodo-2-propynylbutyl carbamate (IPBC). Oxazolidine compounds (e.g., 2-Octyl-4-isothiazolinone) are representative of nitrogen based biocides. An exemplary sulfur based organic biocide is 2-n-octyl-4-isothiazolin-3-one (OIT). An example of a phenolic organic biocide is trichlorophenoxy phenol (TCPP). Quaternary ammonium compounds can also be used, e.g., n-alkyl dimethyl benzyl ammonium chloride, dimethyl didecyl ammonium chloride, or poly(oxy-1,2-ethanediyl(dimethylimino)-1,2-ethanediyl(dimethylimino)-1,2-ethanediyl dichloride). Two particular commercial biocidal products suitable for use are Zinc PYRION (based on zinc pyrithone) and PREVENTOL A 14-D (composed of 2-Octyl-4-isothiazolinone (<5%, CAS 26530-20-1), Carbendazim (<10%, CAS 10605-21-7), Kaolin (10-25%, CAS 1332-58-7), Diuron (10-25%, CAS 330-54-1)). The person of ordinary skill in the art will determine an effective amount of biocidal additive, for example, in the range of 0.005 to 10 percent by weight.

The body of foamed polymer can include a variety of other additives. The person of ordinary skill in the art will include such other additives in amounts necessary to provide the body of foamed polymer, or the curable composition from which it is made, with desirable properties in view of the present disclosure. Such additional additives can include, for example, rheology modifiers, thickeners, friction modifiers, surfactants, viscosity modifiers, and chain extension catalysts.

The roofing elements described herein can be made in a variety of shingle-, tile- or shake-based configurations. For example, in certain embodiments as otherwise described herein, a roofing element has a headlap portion and an exposure portion, wherein the headlap portion is adapted to have its top surface generally covered in the installed condition of the roofing element on a roof, and the exposure portion being adapted to have its top surface generally uncovered and weather-exposed in the installed condition of the roofing element on a roof. Such a roofing element is shown in the plan view of FIG. 2. Roofing element 100 has a headlap portion 150 that is adapted to have its top surface generally covered when installed on a roof (e.g., by overlapping roofing elements) and an exposure portion 155 that is adapted to have its top surface generally uncovered and weather-exposed in the installed condition on the roof.

The roofing element can have any desirable size for a roofing shingle, tile or shake. For example, the roofing element can have a length in the range of 20-50" (e.g., in the range of 20-40", or in the range of 30-50") and/or a height in the range of 8"-20" (e.g., in the range of 12-20", or in the range of 8-16").

As described above, in the roofing elements of the disclosure the body of foamed cured cross-linked polymer has a thickness in the range of 0.5 mm to 35 mm. In certain embodiments as otherwise described herein, the body of foamed cured cross-linked polymer has a thickness in the range of 0.5 mm to 25 mm, or 0.5 mm to 15 mm, or 0.5 mm to 10 mm, or 0.5 mm to 5 mm, or 1 mm to 35 mm, or 1 mm to 25 mm, or 1 mm to 15 mm, or 1 mm to 10 mm, or 1 mm to 5 mm, or 2 mm to 35 mm, or 2 mm to 25 mm, or 2 mm to 15 mm, or 2 mm to 10 mm, or 2 mm to 5 mm, or 10 mm to 35 mm, or 10 mm to 25 mm. Thinner bodies can be used to make roofing elements in the form of roofing shingles. Thicker bodies can be used to make roofing elements in the form of roofing shakes or tiles. The person of ordinary skill in the art will appreciate, e.g., that when the body of foamed polymer is relatively thin, it may not be much thicker than the support sheet on which its formed. Accordingly, the person of ordinary skill in the art will understand that the relative thickness of the body of foamed polymer and the support sheet are not necessarily shown to scale in the figures.

The roofing element can have any desired construction type for a roofing shingle. For example, the roofing element can be of a multi-tab construction (e.g., 3-tab) and/or can be of a laminated construction (e.g., with multiple laminated layers in the exposure portion to provide the appearance of thickness).

As noted above and described with respect to FIGS. 1 and 2, the roofing element includes a layer of weather-resistant roofing granules disposed on and adhered to the top surface of the body of foamed cured polymer. In certain advantageous embodiments of the roofing element as otherwise described herein, the roofing granules are adhered directly to the body of foamed polymer; in many cases, the foamed polymer itself can be sufficiently adhesive such that no additional adhesive material is necessary. In such embodiments, the granules can be embedded in the top surface of the body of foamed cured cross-linked polymer, e.g., as shown in FIG. 1. However, in other embodiments, a separate adhesive can be used to adhere the granules to the body of foamed polymer. This is shown with reference to a polymer film at the top surface of the body of foamed cured cross-linked polymer in FIG. 6. And in other embodiments, a granule-coated film can be disposed at the top surface of the body of foamed cured cross-linked polymer, e.g., as described in U.S. Pat. No. 7,125,601, which is hereby incorporated herein by reference in its entirety. Of course, in other embodiments, an adhesive can be disposed immediately between the top surface of the body of foamed cured cross-linked polymer and the granules.

The person of ordinary skill in the art will appreciate that a variety of types of roofing granules can be used in the roofing elements described herein. Roofing granules can be selected to provide a desired color to the roofing element, and can also provide a degree of solar reflectance themselves. Roofing granules need not be homogeneously disposed over the entire top surface of the body of foamed polymer. For example, more expensive colored/solar reflective roofing granules can be disposed in the exposure portion, while cheaper granules can be disposed in the headlap portion. And in some embodiments, there need not be any roofing granules disposed in the headlap zone; the body of foamed polymer can be sufficiently cured such that it does not become sticky as the roof heats up in direct sunlight, obviating one reason for granules in conventional asphalt roofing shingles. Granules can be partially embedded in the top surface of the foamed polymer body, as is conventional in the roofing arts.

In certain embodiments, the roofing granules include a biocidal compound disposed substantially at their outer surfaces (i.e., such that they can provide their biocidal activity at the outer surface). For example, the roofing granules can include one or more of the biocidal compounds disclosed above disposed substantially at their outer surfaces. Such roofing granules are disposed, for example, in U.S. Patent Application Publications nos. 2007/0148342, 2007/0148340, 2008/0118640 and 2008/0131664.

Figure 8:
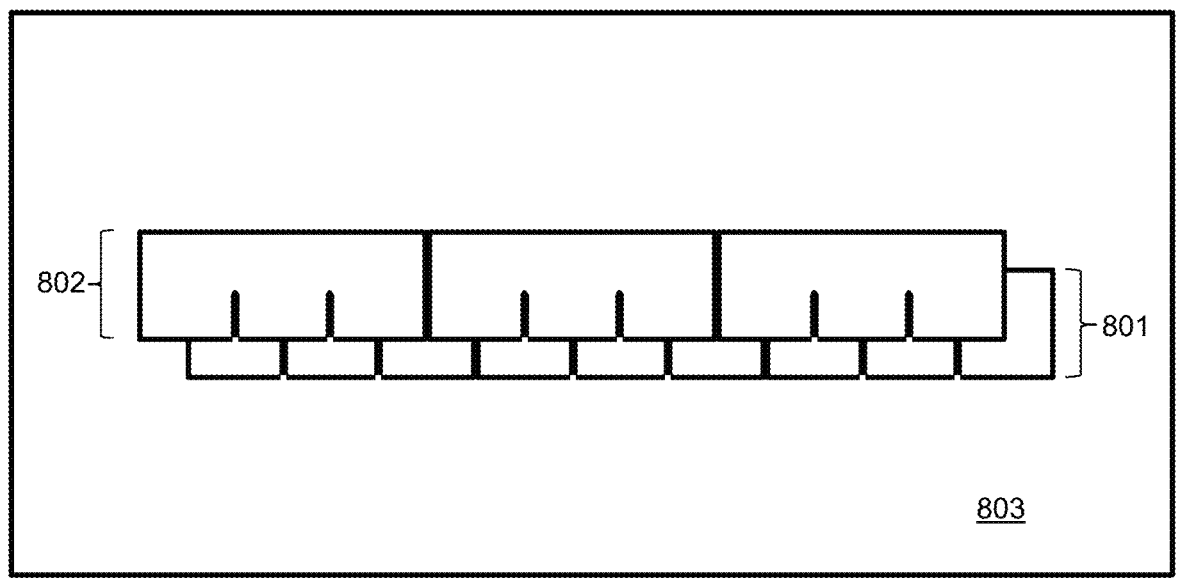
FIG. 8 is a schematic plan view of an array of roofing elements according to one embodiment of the disclosure.

Another aspect of the disclosure is an array of the roofing elements as described herein, disposed on a roof deck. The person of ordinary skill in the art will appreciate that such an array can be configured in a variety of ways. For example, in certain embodiments the array will include at least a first row of roofing elements and a second, overlapping row of roofing elements, with the headlap portions of the roofing elements of the first row being overlapped by the roofing elements of the second row. This conventional arrangement is shown in FIG. 8, with first row 801 being overlapped by second row 802, both disposed on a roof deck 803. The person of ordinary skill in the art will appreciate that there can be many such overlapping rows continuing up a roof deck.

Another aspect of the disclosure is a process for making a roofing element as described herein. The present inventors have determined that the foamed polymer body can be made by physically beating or whipping air into a curable composition, then allowing that composition to cure to provide the foamed polymer. Accordingly, in one embodiment, the disclosure provides a process for preparing a roofing element as otherwise described herein. Such a process is shown in the schematic flowchart view of FIG. 9. The process includes providing a wet body of a foamed curable composition 960. The foamed curable composition 960 is adapted to provide the foamed cured cross-linked polymer upon curing. The wet foamed curable composition has a wet foam density of about 0.1 g/mL to about 1.0 g/mL. The wet roofing element precursor 970 so formed is then allowed to cure, to provide the body of foamed polymer 910.

The curable composition can be any curable composition that provides the polymers described above, e.g., with the various additives, cross-linkers and fillers as described above. The person of ordinary skill in the art will select a particular curable composition based on the disclosure herein. The base of the curable composition can be, for example, a water-borne emulsion or latex, e.g., available under the Rhoplex or Avicor trade names, or a water-borne polyurethane dispersion, or a water-borne PVDF latex. The person of ordinary skill in the art can add materials to the base as desired to provide a suitably foamable curable composition based on the disclosure herein. When such aqueous materials cure, the water evaporates, leaving behind the structured foamed polymer.

The curable composition can be provided with a range of wet foam densities. For example, in certain embodiments, the wet foam density of the curable composition is about or about 0.15 to about 1.0 g/mL, or about 0.2 to about 1.0 g/mL, or about 0.25 to about 1.0 g/mL, or about 0.3 to about 1.0 g/mL, or about 0.4 to about 1.0 g/mL, or about 0.1 to about 0.7 g/mL, or about 0.15 to about 0.7 g/mL, or about 0.2 to about 0.7 g/mL, or about 0.25 to about 0.7 g/mL, or about 0.3 to about 0.7 g/mL, or about 0.1 to about 0.5 g/mL, or about 0.15 to about 0.5 g/mL, or about 0.2 to about 0.5 g/mL, or about 0.25 to about 0.5 g/mL, or about 0.3 to about 0.5 g/mL, or about 0.3 to about 0.4 g/mL.

The person of ordinary skill in the art will appreciate that the wet body of foamed curable composition can be provided in a number of fashions. For example, the wet body can be provided by forming a wet body from a foamed curable composition. The wet body can be formed in a variety of ways, e.g., by dispensing the foamed curable composition into a mold, or by coating the foamed curable composition onto one or both sides of a support sheet, or dispensing the foamed curable composition onto a backing sheet or onto a polymer film. Conveyer systems like those typically used in the manufacture of asphalt shingles can be adapted for construction of the wet body of foamed curable composition.

The foamed curable composition can be provided in a number of ways. For example, the foamed curable composition can be provided by beating or whipping air into a curable composition. As described above, foaming auxiliaries can be used to help stabilize the foam until the composition is cured. The beating or whipping can be performed using any desirable apparatus; at laboratory scale, a conventional kitchen mixer can be used, while analogous systems can be used at a manufacturing scale. It can be desirable to perform the whipping at least two different speeds, e.g., including a first beating or whipping step at a first, relatively high speed to efficiently incorporate air into the composition, followed by a second, relatively slower speed step in order to break down larger air cells into smaller air cells. Continuous foam generator apparati can also be used, especially at a manufacturing scale. The person of ordinary skill in the art will, based on the disclosure herein, use such apparati to incorporate of air into a curable composition, for example by using two different sets of conditions in sequence to incorporate the air (e.g., a first, more turbulent condition to incorporate air, followed by a second, less turbulent condition to break down larger cells to smaller cells).

The wet roofing element precursor is allowed to cure, such that the curable composition cures to form the body of foamed polymer. The curing can involve cross-linking of the polymer, as well as the evaporation of any solvent (e.g., water in the case of water-borne latexes or emulsions) that is present in the curable composition. The curing can be performed at any desired temperature, depending on the types of cross-linking and solvents involved. For example, in certain embodiments, the wet roofing element precursor is allowed to cure at ambient temperature. In other embodiments, the wet roofing element precursor is allowed to cure at a temperature of between about 60 to about 200° C., or about 70 to about 170° C., or about 75° C. to about 150° C., or about 100 to about 200° C., or about 140 to about 200° C., or about 150 to about 200° C., or about 100 to about 180° C., or about 140 to about 180° C., or about 100 to about 160° C., or about 140 to about 160° C., or about 140 to about 160° C.

Figure 9:
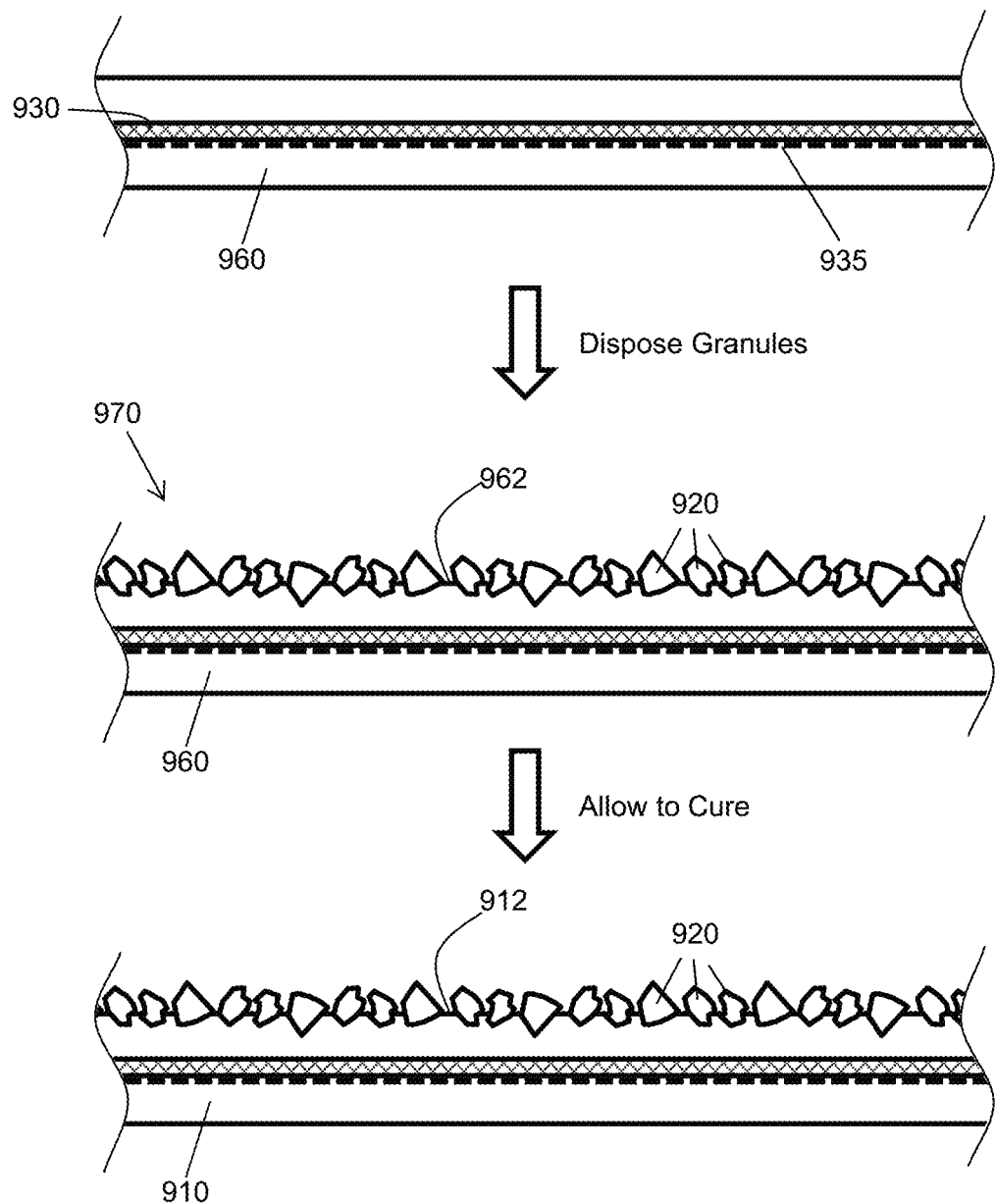
FIG. 9 is a schematic cross-sectional flowchart view of a process for making a roofing shingle as described herein.

In the embodiment of FIG. 9, weather-resistant granules 920 are disposed on a top surface 962 of the wet body of the foamed curable composition 960, such that when the foamed curable composition is cured to form the body, the granules 920 are embedded in and adhered to its top surface 912. However, the granules can be disposed at the top surface of the roofing element at any desirable point in the process. For example, in one embodiment, an adhesive is disposed on a top surface of the wet body, then the granules are disposed on the adhesive, then the adhesive and the wet body are allowed to cure to provide the roofing element. In another embodiment, the wet body is cured to provide the body of foamed cured cross-linked polymer, and then the adhesive and granules are disposed on the top surface thereof and cured separately to provide the roofing element. When a polymer film is to be disposed at the top surface of the body of foamed cured cross-linked polymer, the granules and adhesive can be dispensed thereon either before or after the wet body is cured. The granules can be deposited onto the top surface of the wet body of foamed curable composition using any convenient method. Other methods can be used, e.g., dispensing the granules and adhering them to a polymer film first, then disposing that granule-coated film to a top surface of the wet body of foamed curable composition or the body of cured cross-linked polymer, e.g., as described in U.S. Pat. No. 7,125,601. The person of ordinary skill in the art can adapt conventional granule dropping systems for use in the processes described herein.

When a polymer film is to be disposed in or at a surface of the body of foamed cured cross-linked polymer, such polymer film can be introduced at any stage of the process. For example, a foamed curable composition can be dispensed onto a sheet of material such as a polymer film (with the sheet of material to be disposed either at the top surface or the bottom surface of the body of foamed cured cross-linked polymer). Alternatively or in addition, a sheet of material can be disposed on a surface of a wet body of foamed curable composition. Such processes can be performed using roll-to-roll processing and conveyor systems, as is conventional in the asphalt shingle arts.

Certain aspects of the disclosure are now explained further via the following non-limiting examples.

EXAMPLES

To provide a body of foamed polymer with a desired wet foam density and cell morphology, it is necessary to control the wet foam density and cell morphology of the curable composition. The use of surfactant-based foam auxiliaries can help stabilize the foam cellular structure, and the use of different mixing speeds in the beating or whipping step can help to provide a desired cell size and structure. The person of ordinary skill in the art will provide a curable composition having a desired wet foam density and cell morphology based on the disclosure herein, and especially on the examples described below.

Materials

Materials used in these examples are listed in Table 1. A series of Rhoplex® (including EI 5100, EI 3100, 3000, 2885, SG-10, 501, 1791) are obtained from Dow Chemical.

Avicor®0601 (from Celanese emulsion polymers), Calcium Carbonate (from Hubercarb, with particle size about 8 micron meter), Tamol® 731A (from Dow Chemical), Berset® 2720 (from Bercen, Inc.), Stokal® SR and Stoka® STA (from Bozzetto group), Aerosol® OT-75E OPV surfactant is from Cytec, Plastistrength® (from Arkema) are used without any purification. An exemplary formulation provided in Table 1 is: Rhoplex® EI5100 (52 wt %, 300 g), Calcium Carbonate (39 wt %, 225 g), Tamol® 731 (1.5 wt %, 8.7 g), Berset® 2720 (2.6 wt %, 15.1 g), Stokal® SR (1 wt %, 5.8 g), Stokal® STA (2.1 wt %, 12.3 g), Plastistrength® (2.3 wt %, 13.6 g).

TABLE 1

Materials used in the formulation

| Chemical Trade Name | Major Active Component | Role |
| --- | --- | --- |
| Rhoplex EI 5100 | Acrylic polymer | Polymer substrate |
| Calcium Carbonate | $CaCO_3$ | Fire retardant filler |
| Tamol 731 | $Na^+$ of maleic anhydride copolymer | Dispersant |
| Berset 2720 | Ammonium zirconium carbonate | Cross linker |
| Stokal SR | Succinamate-based surfactant | Foaming agent |
| Stoka STA | Ammonium stearate | Foaming stabilizer |
| Plastistrength | poly(methylmethacrylate-co-butylacrylate) | Acrylic processing aids |
| AcrylsolTM RM-2020 | non-ionic urethane | Rheology modifier |
| Zinplex 15 | Zinc ion source | Cross linker |

General Methods

Calcium carbonate filler was dispersed in an acrylic polymer to prepare homogenous colloidal emulsion, and mixed with an air mixer equipped with a dispersant blade. Specifically, in a 1 L size plastic cup, 300 g Rhoplex® EI 5100 is added, followed by 8.7 g of Tamol 731. To this mixture, under medium to high mixing speed, 225 g calcium carbonate is added gradually. The mixture was then mixed at high speed for 5 minutes to achieve a dispersion having a desired viscosity. Brookfield viscometer (model: RV DV2T) is used to measure viscosity. Viscosity was measured as 2520 cp (under shear speed of 10 rpm) at this stage.

KitchenAid 5-Quart Mixer (model: KSM75) equipped with wire whip blade is then used to whip in air to obtain acrylic foam. General whipping procedures includes: whipping at high speed from 3-5 minutes, then reducing to medium speed for 6-8 minutes and finally whipping at low speed for 10 minutes or more. High speed mixing impacts the amount of air being incorporated in the emulsion, while low speed mixing breaks down big air bubble into fine sizes.

The polymer foam is then coated the on a glass mat (optionally, granules may be added on top of the foam) and heated in an air circulated oven (Oven Gage ID: 1069) at 75° C. for 1 hr to fully cure the acrylic resin.

Example 1

100 g of Rhoplex 1791, 100 g of Rhoplex SG-10M, 200 g of calcium carbonate, and 6 g of Tamol 731 were mixed with a high speed disperser. The mixture was transferred to a Hobart mixer, then 4 g of Acrysol RM-2020, 20 g of Berset 2720, 10 g of Stokal SR, and 2 g of Stokal STA were added under high speed agitation for 3 minutes, followed by agitation at medium speed for 3 minutes and low speed for 5 minutes. The resulting resin mixture was applied on a fiber glass mat, and granules were then applied on the top of the resin mixture. The treated fiber glass mat was dried in an oven at 150° C. for 25 minutes. The cured sample was taken out of the oven, and the resin mixture was applied on the backside of the sample, and placed in an oven at 150° C. for 25 minutes. A roof shingle was completed.

Example 2

100 g of Rhoplex 1791, 100 g of Rhoplex SG-10M, 200 g of calcium carbonate, and 6 g of Tamol 731 were mixed with a high speed disperser. The mixture was transferred to a Hobart mixer, then 4 g of Acrysol RM-2020, 20 g of Zinplex 15, 10 g of Stokal SR, and 2 g of Stokal STA were added under high speed agitation for 3 minutes, followed by agitation at medium speed for 3 minutes and low speed for 5 minutes. The resulting resin mixture was applied on a fiber glass mat, and granules were then applied on the top of the resin mixture. The treated fiber glass mat was dried in an oven at 150° C. for 25 minutes. The cured sample was taken out of the oven, and the resin mixture was applied on the backside of the sample, and placed in an oven at 150° C. for 25 minutes. A roof shingle was completed.

Example 3

100 g of Rhoplex 1791, 100 g of Rhoplex SG-10M, 200 g of calcium carbonate, and 6 g of Tamol 731 were mixed with a high speed disperser. The mixture was transferred to a Hobart mixer, then 4 g of Acrysol RM-2020, 20 g of Berset 2040, 10 g of Stokal SR, and 2 g of Stokal STA were added under high speed agitation for 3 minutes, followed by agitation at medium speed for 3 minutes and low speed for 5 minutes. The resulting resin mixture was applied on a fiber glass mat, and granules were then applied on the top of the resin mixture. The treated fiber glass mat was dried in an oven at 150° C. for 25 minutes. The cured sample was taken out of the oven, and the resin mixture was applied on the backside of the sample, and placed in an oven at 150° C. for 25 minutes. A roof shingle was completed.

Example 4

100 g of Rhoplex GL-618, 100 g of Rhoplex E940, 200 g of calcium carbonate, and 6 g of Tamol 731 were mixed with a high speed disperser. The mixture was transferred to a Hobart mixer, then 4 g of Acrysol RM-2020, 10 g of Stokal SR, and 2 g of Stokal STA were added under high speed agitation for 3 minutes, followed by agitation at medium speed for 3 minutes and low speed for 5 minutes. The resulting resin mixture was applied on a fiber glass mat, and granules were then applied on the top of the resin mixture. The treated fiber glass mat was dried in an oven at 150° C. for 25 minutes. The cured sample was taken out of the oven, and the resin mixture was applied on the backside of the sample, and placed in an oven at 150° C. for 25 minutes. A roof shingle was completed.

Example 5

300 g of Rhoplex® 5100, 225 g of calcium carbonate, and 8.7 g of Tamol 731 were mixed with a mechanical mixer. The mixture was transferred to a Hobart mixer, then 5.8 g of Stokal® SR, 12.3 g of Stoke® STA and 13.6 g Plastistrength®, 15.1 g of Berset 2720 were added under high speed agitation for 6 minutes, followed by agitation at medium speed for 8 minutes and low speed for 15 minutes.

The resulting foam was coated on a glass mat, and granules were then applied on the top of the foam. The treated fiber glass mat was dried in an air circulated oven at 75° C. for 1 hr to fully cure the acrylic resin. A roof shingle was completed.

Example 6

160 g of Rhoplex® 5100, 40 g of Avicor®601, 150 g of calcium carbonate, and 5.8 g of Tamol 731 were mixed with a mechanical mixer. The mixture was transferred to a Hobart mixer, then 9.69 g of Stokal® SR, 5.8 g of Stoka® STA and 10.08 g of Berset 2720 were added under high speed agitation for 6 minutes, followed by agitation at medium speed for 8 minutes and low speed for 15 minutes. The resulting foam was coated on a glass mat, and granules were then applied on the top of the foam. The treated fiber glass mat was dried in an air circulated oven at 75° C. for 1 hr to fully cure the acrylic resin. A roof shingle was completed.

Example 7

100 g of Rhoplex® 5100, 100 g of Avicor®601, 150 g of calcium carbonate, and 5.8 g of Tamol 731 were mixed with a mechanical mixer. The mixture was transferred to a Hobart mixer, then 9.69 g of Stokal® SR, 5.8 g of Stoka® STA and 10.08 g of Berset 2720 were added under high speed agitation for 6 minutes, followed by agitation at medium speed for 8 minutes and low speed for 15 minutes. The resulting foam was coated on a glass mat, and granules were then applied on the top of the foam. The treated fiber glass mat was dried in an air circulated oven at 75° C. for 1 hr to fully cure the acrylic resin. A roof shingle was completed.

Example 8

40 g of Rhoplex® 5100, 160 g of Avicor®601, 150 g of calcium carbonate, and 5.8 g of Tamol 731 were mixed with a mechanical mixer. The mixture was transferred to a Hobart mixer, then 9.69 g of Stokal® SR, 5.8 g of Stoka® STA and 10.08 g of Berset 2720 were added under high speed agitation for 6 minutes, followed by agitation at medium speed for 8 minutes and low speed for 15 minutes. The resulting foam was coated on a glass mat, and granules were then applied on the top of the foam. The treated fiber glass mat was dried in an air circulated oven at 75° C. for 1 hr to fully cure the acrylic resin. A roof shingle was completed.

Example 9

160 g of Rhoplex® 5100, 40 g of Avicor®601, 150 g of calcium carbonate, and 5.8 g of Tamol 731 were mixed with a mechanical mixer. The mixture was transferred to a Hobart mixer, then 9.69 g of Stokal® SR, 5.8 g of Stoka® STA, 10.08 g of Berset 2720, and 2 g of Aerosol® OT-75% were added under high speed agitation for 6 minutes, followed by agitation at medium speed for 8 minutes and low speed for 15 minutes. The resulting foam was coated on a glass mat, and granules were then applied on the top of the foam. The treated fiber glass mat was dried in an air circulated oven at 75° C. for 1 hr to fully cure the acrylic resin. A roof shingle was completed.

Example 10

160 g of Rhoplex® 5100, 40 g of Avicor®601, 150 g of calcium carbonate, and 5.8 g of Tamol 731 were mixed with a mechanical mixer. The mixture was transferred to a Hobart mixer, then 9.69 g of Stokal® SR, 5.8 g of Stoka® STA and 10.08 g of Berset 2720 were added under high speed agitation for 6 minutes, followed by agitation at medium speed for 8 minutes and low speed for 15 minutes. The resulting foam was coated on a glass mat, and granules were then applied on the top of the foam. A glass mesh (mesh size: 2×2 inch) was then placed underneath the treated glass mat, and the resulting mat was dried in an air circulated oven at 75° C. for 1 hr to fully cure the acrylic resin. A roof shingle was completed.

Results

1) Influence of Surfactant Type and Ratio on Foam Density

Foams can be classified based on the cell size and density. Broad classifications based on cell size are as follows: conventional foam: cell size>300 μm; fine-cell foam: 10μ<cell size<300 μm; and micro-cellular Foam: cell size<10 μm. Classifications of foam type based on foam density are as follows: very light: <0.05 g/mL; light: 0.05-0.2 g/mL; medium; 0.2-0.5 g/mL; heavy; 0.5-0.7 g/mL; and very heavy: >0.7 g/mL.

Figure 10:
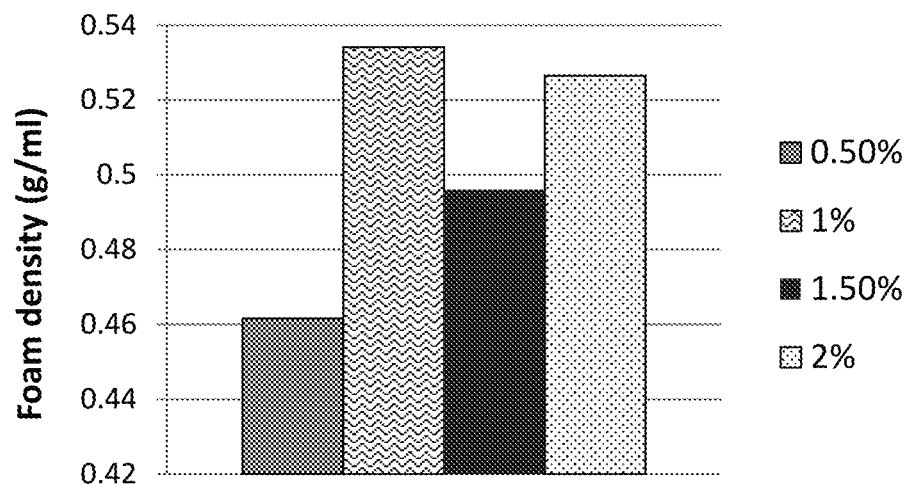
FIG. 10 is a bar graph showing the influence of surfactant ratio on wet foam density.

In order to be cost competitive with asphalt shingles, it can be desirable for the wet foamed curable composition density to be between, e.g., 0.3-0.4 g/mL. As shown in Table 2 and FIG. 10, when using Rheoplex® series acrylic and Stokal® SR and Stokal® STA combination, the density changes from 0.46-0.53 g/mL by changing the relative ratio between foaming agent and foam stabilizer. The combination with 0.5% Stokal® SR and 2.5% Stokal® STA gives lowest foam density. The foam density can be further reduced by following approaches: (1) adding small amount of water in the original formulation; (2) using Avicor®601 to replace Rhoplex® series or mix together with Rhoplex® (Avicor®601 tends to produce relatively lighter foam and much finer cell size structure); and/or (3) In addition to Stokal® SR and Stokal® STA, including surfactant Aerosol® OT-75E OPV in the formulation. Table 3 lists foam density of mixing Rhoplex® and Avicor®601.

TABLE 2

Influence of surfactant SR/STA ratio in foam density

| SR content | STA content | Foam Mass per Cup (g) | SR/STA ratio | Foam Density (g/mL) |
|---|---|---|---|---|
| 0.5 | 2.6 | 121 | 0.192 | 0.46 |
| 1 | 2.1 | 140 | 0.476 | 0.53 |
| 1.5 | 0.6 | 130 | 2.5 | 0.50 |
| 2 | 1.1 | 138 | 1.818 | 0.53 |

TABLE 3

Influence of acrylic Rhoplex ®/Avicor ®601 ratio in foam density

| Rhoplex ®/ Avicor ®601 | Foam Mass per Cup (g) | Foam Density (g/ml) |
|---|---|---|
| 50:50 | 65 | 0.25 |
| 60:40 | 73 | 0.28 |
| 70:30 | 82 | 0.31 |
| 80:20 | 83 | 0.32 |

2) Influence of Mixing Speed on Foam Density

Figure 11:
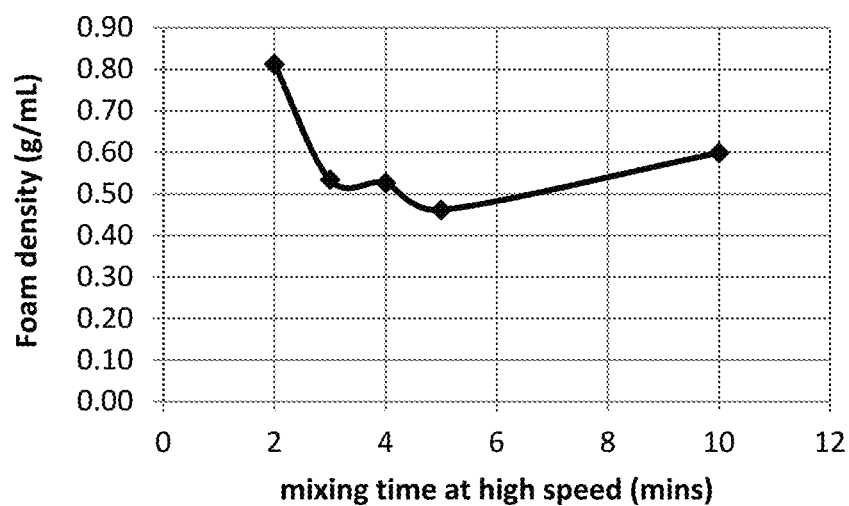
FIG. 11 is a graph showing the influence of whip time on wet foam density.

The protocol for foaming using a kitchen aid mixer has been divided into 3 stages: first whip at high speed for a short period of time (such as 2-5 minutes), followed by whip at medium speed, and finally whip at low speed. The high speed whip can be important to incorporate air into the colloidal emulsion while the low speed whip can be important to break down the air bubbles to smaller sizes. As shown in FIG. 11, the foam density decreased initially with the increase of high speed whipping time from 2 minutes to 4 minutes. However when whipping was for 5 minutes or longer, foam density increased, likely from the viscosity rise of the emulsion as well as the deflection of air bubbles. As a result, mixing at high speed for 5 minutes was used in later studies.

Of course, in production, other methods for generating foam can be used, e.g., continuous foam generators. The person of ordinary skill in the art will determine the operational parameters to provide the desired foam characteristics in view of the disclosure herein.

3) Physical Properties of Foam

Cell structure: Foams in general can be classified as an "open-cell" or "closed-cell" structures. The cell structure determines the principal applications for such foams. Table 4 summarizes few common examples.

TABLE 4

Cell Structure and Their Principle Applications
Principle Applications

| Closed Cell | Open Cell |
| --- | --- |
| Thermal Insulation | Acoustic Insulation |
| Packaging | Cushioning |
| Buoyancy | Filtration |
| Gaskets | Packaging |

Figure 12:
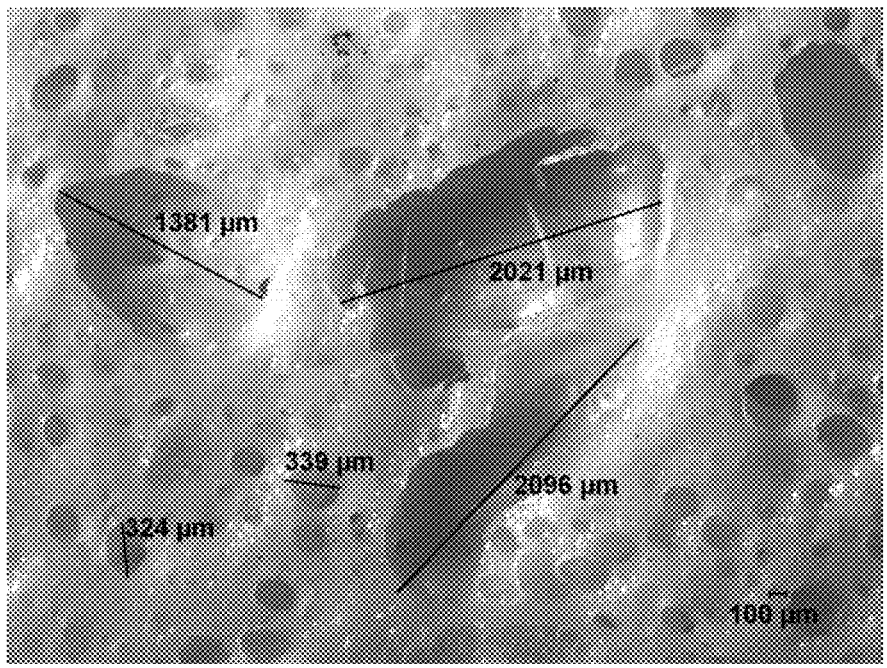
FIG. 12 is a set of pictures showing foam cell morphology of (a) samples prepared by other methods, and (b) sample prepared with 0.5% Stokal® SR and 2.5% Stokal® STA.
Figure 12:
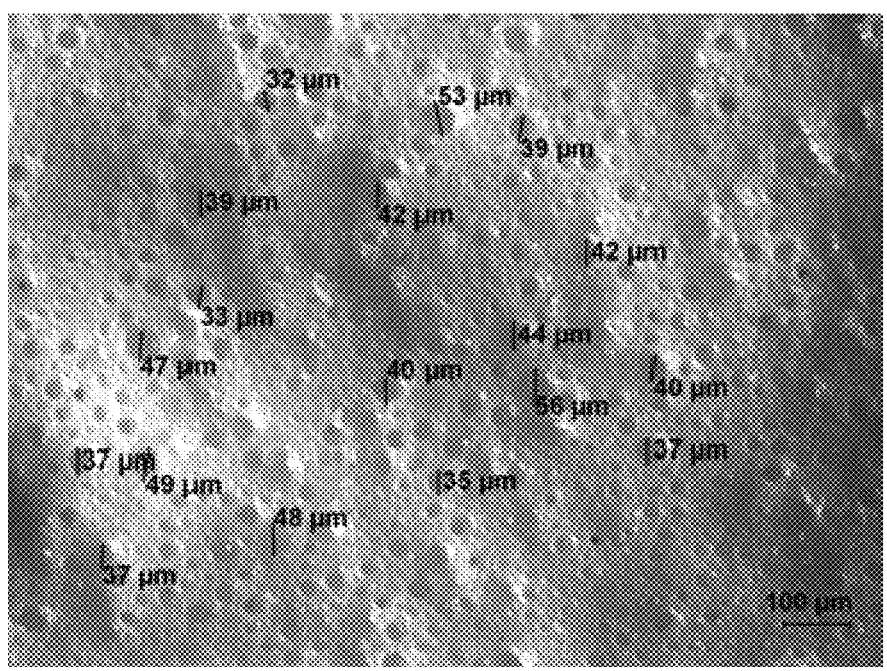
Figure 13:
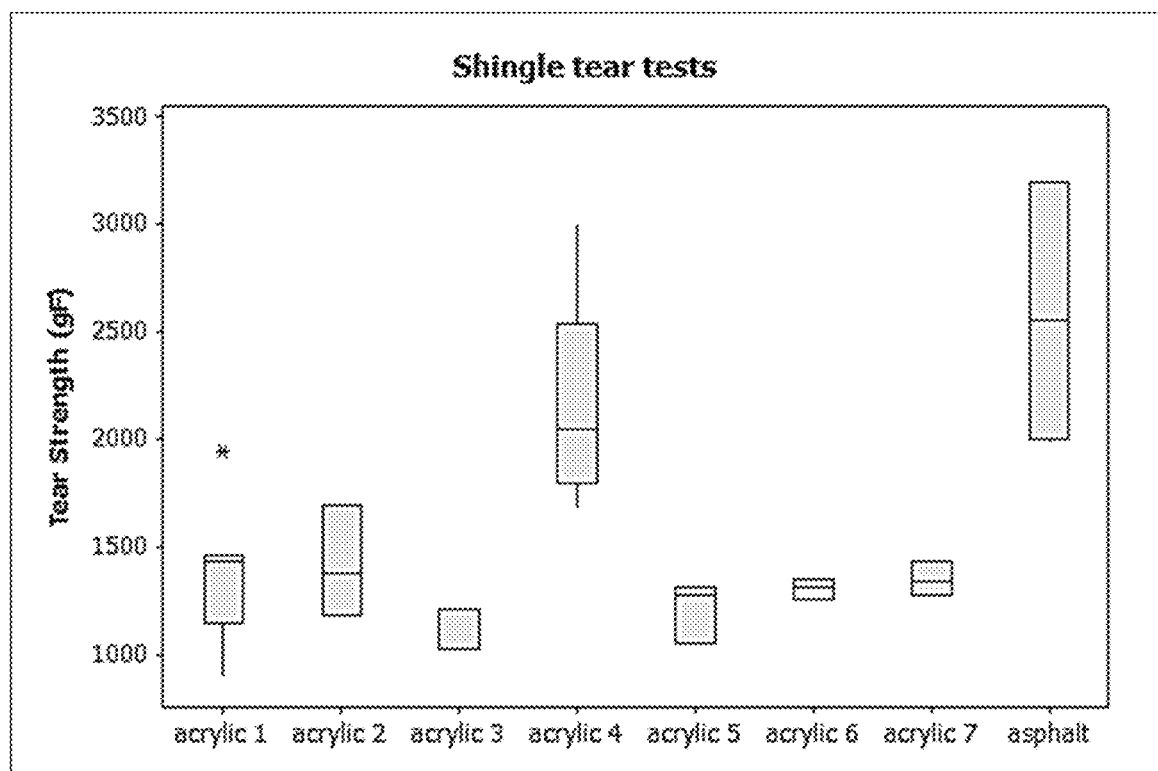
FIG. 13 is a graph comparing the tear strength of various roofing elements of the disclosure made from different acrylic resins.

As shown in FIG. 12, acrylic foam morphology has been studied using optical microscope. A closed cell structure is achieved with size range from 35-50 μm.

It can be important in the practice of the methods described herein to obtain stable cell structures. As shown in Table 2 and FIG. 12, stable closed-cell fine size foam structures were successfully obtained. It has been shown in literature that, as the cell size decreases, there is a corresponding increase in tensile strength, elongation, tear strength, and resistance to compression. The following sections discuss preliminary test results of shingles made from curing acrylic foams.

Foam Resistance Abilities (Water proofing tests): In order to estimate the ability of holding water, a shingle of the disclosure is cut into 6×6 inch sample size, and a 500 mL graduated cylinder (~0.108 inch diameter) with a hole at the bottom (diameter around 0.108 inch) is fastened above the shingle by silicone caulk. Water is added to the reading of 100 mL, and then the top of the graduated cylinder is sealed with Parafilm to prevent evaporation of water. Reading of the water levels in the cylinder is taken at different time intervals, as shown in Table 5. The shingles of the disclosure showed great potential of water proofing.

TABLE 5

Decrease of water upon time

| Time (hr) | Volume Change (mL) |
| --- | --- |
| 0.5 | 0 |
| 1 | 0 |
| 2 | 0 |
| 3 | 0.5 |

TABLE 5-continued

Decrease of water upon time

| Time (hr) | Volume Change (mL) |
| --- | --- |
| 5 | 1.5 |
| 12 | 3 |

4) Foam Mechanical Property (Tear Test)

Tear strength of shingle in the cross machine direction (CD) is tested by Elmendorf Tear Strength Tester. According to ASTM D1922-94a, tear strength of shingle above 1700 gf is considered as "pass." The preliminary results are shown in FIG. 12. Acrylic 1-Acrylic 7 represent the experiments using different formulations, such as using different types of acrylic resins, changing the amount of acrylic processing aids (e.g., plastistrength), etc. The types of acrylic resins used in this study were as follows: Acrylic 1 is Rhoplex® 3000; Acrylic 2 is Rhoplex® EI3100; Acrylic 3 is Rhoplex® 2885; Acrylic 4 is Rhoplex® 5100; Acrylic 5 is Rhoplex® SG-10; Acrylic 6 is Rhoplex® 501; and Acrylic 7 is Rhoplex® 1791.

Figure 14:
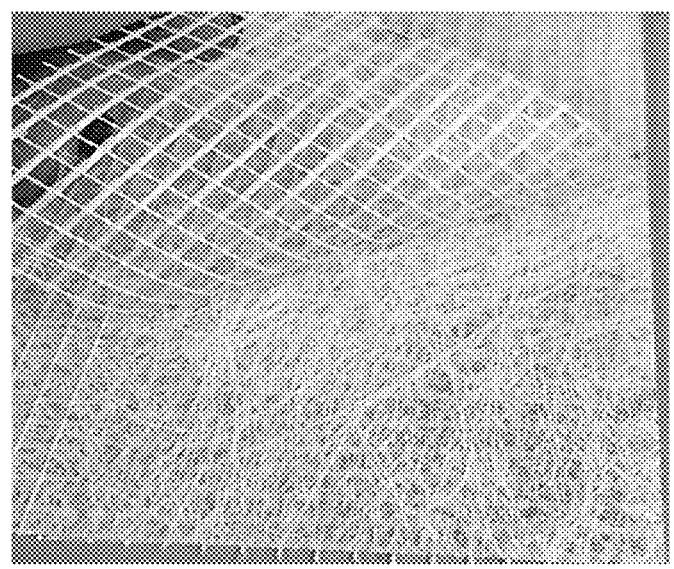
FIG. 14 is a photograph illustrating the use of a glass mesh underneath fiber glass mat in a roofing element of the disclosure.

The formulation giving the highest tear strength, Acrylic 4 (Rhoplex® 5100), has been used in later studies. In order to further improve tear strength, various types of glass mats have also been explored. As shown in FIG. 14, an additional glass mesh (mesh size: 2×2 inch) can be placed underneath glass. It was found that using additional glass mesh (mesh size: 2×2 inch) underneath glass mat improved tear strength significantly. Shingle made by using glass mesh underneath the glass mat provided tear strength beyond instrument measure capability.

5) Foam Flammability (Mini Tunnel Tests)

The flame spray resistance of acrylic foam shingle is simulated by Mini Tunnel test. Performance in this small-scale tunnel test may be roughly correlated to results obtained in the Steiner Tunnel used to conduct ASTM E-84 testing. Typically, the shingles of the disclosure are placed in the tunnel and ignited by the burner that is positioned such that the flame tip is 14" (35.6 cm) from the start end of the tunnel. Progression of the flame from the burning sample along the tunnel is recorded at timed intervals by an operator observing through windows installed in the tunnel "floor". The operator actually monitors the flame by looking at the flame reflection in an angled mirror positioned underneath clear window "floor" of the raised tunnel apparatus. An optical sensor in the tunnel ventilation system gathers data that is used to calculate the smoke index.

Figure 15:
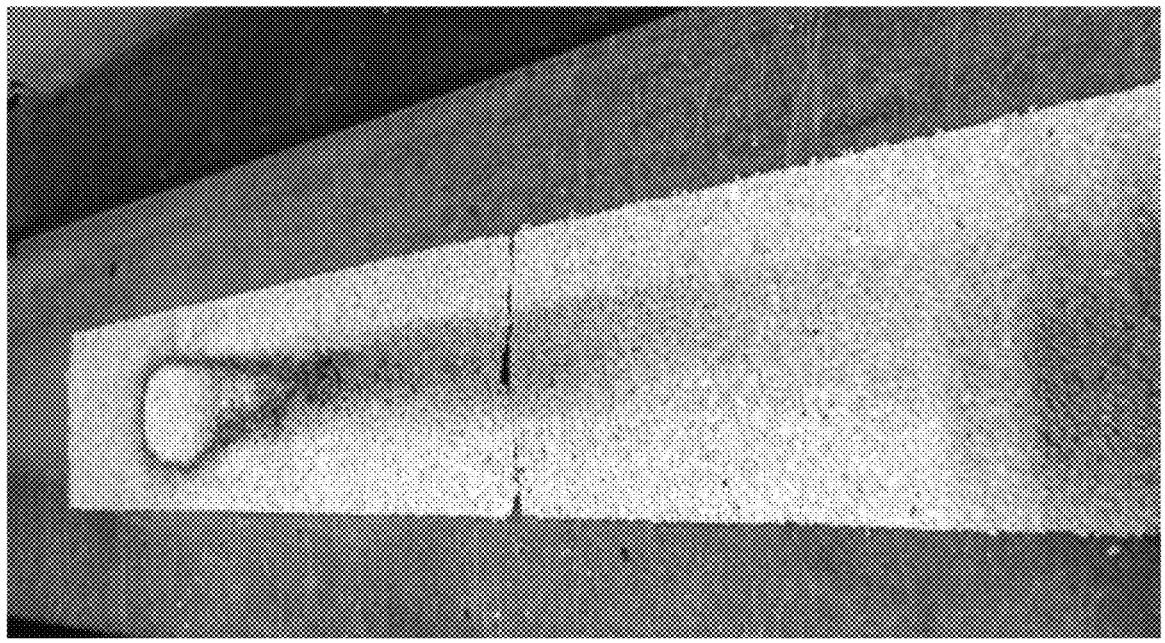
FIG. 15 is a picture of a roofing element of the disclosure after mini-tunnel tests.

FIG. 15 shows the results of mini-tunnel test. No significant lateral spread is observed with the treated shingles indicating that the acrylic foam shingle of the disclosure has good flame retardancy. As a result, the shingles of the disclosure can be configured to pass the ASTM E-84 flame spray test.

Example 11

200 g of Rhoplex® 5100, 150 g of calcium carbonate, and 5.8 g of Tamol 731 were mixed with a mechanical mixer. The mixture was transferred to a Hobart mixer, then 9.69 g of Stokal® SR, 5.8 g of Stoka® STA, 10.08 g of Berset 2720, 2 g of Aerosol® OT-75%, and 1 g preventol A 14D were added under high speed agitation for 6 minutes, followed by agitation at medium speed for 8 minutes and low speed for 15 minutes. The resulting foam was coated on a glass mat, and base granules (National Coatings WA16) were then applied on the top of the foam. The treated fiber glass mat was dried in an air circulated oven at 75° C. for 1 hr to fully cure the acrylic resin. A roof shingle was completed.

Example 12

200 g of Rhoplex® 5100, 150 g of calcium carbonate, and 5.8 g of Tamol 731 were mixed with a mechanical mixer. The mixture was transferred to a Hobart mixer, then 9.69 g of Stokal® SR, 5.8 g of Stoka® STA, 10.08 g of Berset 2720, 2 g of Aerosol® OT-75%, and 2 g preventol A 14D were added under high speed agitation for 6 minutes, followed by agitation at medium speed for 8 minutes and low speed for 15 minutes. The resulting foam was coated on a glass mat, and base granules (National Coatings WA16) were then applied on the top of the foam. The treated fiber glass mat was dried in an air circulated oven at 75° C. for 1 hr to fully cure the acrylic resin. A roof shingle was completed.

Example 13

200 g of Rhoplex® 5100, 150 g of calcium carbonate, and 5.8 g of Tamol 731 were mixed with a mechanical mixer. The mixture was transferred to a Hobart mixer, then 9.69 g of Stokal® SR, 5.8 g of Stoka® STA, 10.08 g of Berset 2720, 2 g of Aerosol® OT-75%, and 1 g Zinc PYRION were added under high speed agitation for 6 minutes, followed by agitation at medium speed for 8 minutes and low speed for 15 minutes. The resulting foam was coated on a glass mat, and base granules (National Coatings WA16) were then applied on the top of the foam. The treated fiber glass mat was dried in an air circulated oven at 75° C. for 1 hr to fully cure the acrylic resin. A roof shingle was completed.

Example 14

200 g of Rhoplex® 5100, 150 g of calcium carbonate, and 5.8 g of Tamol 731 were mixed with a mechanical mixer. The mixture was transferred to a Hobart mixer, then 9.69 g of Stokal® SR, 5.8 g of Stoka® STA, 10.08 g of Berset 2720, 2 g of Aerosol® OT-75%, and 2 g Zinc Pyrion were added under high speed agitation for 6 minutes, followed by agitation at medium speed for 8 minutes and low speed for 15 minutes. The resulting foam was coated on a glass mat, and base granules (National Coatings WA16) were then applied on the top of the foam. The treated fiber glass mat was dried in an air circulated oven at 75° C. for 1 hr to fully cure the acrylic resin. A roof shingle was completed.

Example 15

200 g of Rhoplex® 5100, 150 g of calcium carbonate, and 5.8 g of Tamol 731 were mixed with a mechanical mixer. The mixture was transferred to a Hobart mixer, then 9.69 g of Stokal® SR, 5.8 g of Stoka® STA, 10.08 g of Berset 2720, 2 g of Aerosol® OT-75%, and 1 g Zinc Pyrion were added under high speed agitation for 6 minutes, followed by agitation at medium speed for 8 minutes and low speed for 15 minutes. The resulting foam was coated on a glass mat, and algae-resistant granules (National Coatings WA16, oiled and coated with ZnO) were then applied on the top of the foam. The treated fiber glass mat was dried in an air circulated oven at 75° C. for 1 hr to fully cure the acrylic resin. A roof shingle was completed.

Example 16

200 g of Rhoplex® 5100, 150 g of calcium carbonate, and 5.8 g of Tamol 731 were mixed with a mechanical mixer. The mixture was transferred to a Hobart mixer, then 9.69 g of Stokal® SR, 5.8 g of Stoka® STA, 10.08 g of Berset 2720, 2 g of Aerosol® OT-75%, and 1 g Preventol A14D were added under high speed agitation for 6 minutes, followed by agitation at medium speed for 8 minutes and low speed for 15 minutes. The resulting foam was coated on a glass mat, and algae-resistant granules (National Coatings WA16, oiled and coated with ZnO) were then applied on the top of the foam. The treated fiber glass mat was dried in an air circulated oven at 75° C. for 1 hr to fully cure the acrylic resin. A roof shingle was completed.

Results

Introducing algae-resistant granules on the surface or the use of biocide as additive helped improve solar reflectivity (SR) of standard commercial white roofing shingles (SR of 0.65) and coolstar membrane roof (SR of 0.67).

Use of conventional algae resistant granules on the surface of a cured acrylic foam shingle (i.e., made without biocide) helps to maintain SR after prolonged testing: initial SR is 0.74, final SR is 0.7.

Addition of 1% Preventol A14D in the foam when using base granules (Example 12) helps to maintain SR after prolonged testing: initial SR is 0.8, final SR is 0.75.

1% Zinc pyrithione with base granule (Example 14) has initial SR of 0.78, and final SR of 0.54. Accordingly, in this system, zinc pyrithone was less effective at equivalent loadings than Preventol A14D. However, the person of ordinary skill in the art would select a loading for zinc pyrithone to provide a desired level of algae resistance.

It is understood that the examples and embodiments described herein are for illustrative purposes only and that various modifications or changes in light thereof will be suggested to persons skilled in the art and are to be incorporated within the spirit and purview of this application and scope of the appended claims. All publications, patents, and patent applications cited herein are hereby incorporated herein by reference for all purposes.

We claim:

1. A roofing element in the form of a roofing shingle, shake or tile extending substantially in a plane, the roofing element having a top surface, the roofing element comprising:
    a body of a foamed cured cross-linked polymer, the body having a top surface at the top surface of the roofing element and a bottom surface, the body extending substantially in the plane,
    a support sheet disposed within the body of foamed cured cross-linked polymer, the support sheet comprising roofing felt; and
    a layer of weather-resistant roofing granules disposed on and adhered at the top surface of the roofing element,
    wherein the weather-resistant roofing granules are disposed directly on and partially embedded in a top surface of the body of the foamed cured cross-linked polymer,
    wherein the roofing element has an asphalt content of less than about 5 wt %, and
    wherein the roofing element passes the ASTM E-84 flame spray test.

2. The roofing element of claim 1, having an asphalt content of less than about 2 wt %.

3. The roofing element of claim 1, further comprising a mesh sheet disposed within the body of foamed cured cross-linked polymer.

4. The roofing element of claim 1, further comprising a backing sheet disposed on the bottom surface of the body of foamed cured cross-linked polymer.

5. The roofing element of claim 1, wherein the body of foamed cured cross-linked polymer is in the form of a substantially closed-cell foam.

6. The roofing element of claim 1, comprising a support sheet that is a glass mat, and a polymer film disposed on a bottom surface of the body of foamed cured cross-linked polymer.

7. The roofing element of claim 1, wherein the body of foamed cured cross-linked polymer has a density in the range of 1 g/mL to 2 g/mL.

8. The roofing element of claim 1, wherein the body of foamed cured cross-linked polymer has a void volume, and wherein no more than 10% of the void volume is formed by foam cells having a longest dimension in excess of 100 microns.

9. The roofing element of claim 1, wherein the polymer of the body of foamed cured cross-linked polymer is a poly(meth)acrylate-based polymer, a polyurethane/acrylate hybrid polymer, a polyurethane, a polyvinylidine difluoride or a copolymer thereof.

10. The roofing element of claim 1, wherein the polymer of the body of foamed cured cross-linked polymer is a poly(meth)acrylate-based polymer or a polyurethane/acrylate hybrid polymer.

11. The roofing element of claim 1, wherein the body of foamed cured cross-linked polymer further comprises a filler.

12. The roofing element of claim 1, having a headlap portion and an exposure portion, wherein the headlap portion is adapted to have its top surface generally covered in the installed condition of the element on a roof, and the exposure portion being adapted to have its top surface generally uncovered and weather-exposed in the installed condition of the element on a roof.

13. The roofing element of claim 1, wherein the body of foamed polymer has a thickness of at least 0.5 mm.

14. The roofing element of claim 1, wherein the body of foamed polymer has a thickness of at least 2 mm.

15. The roofing element of claim 1, wherein the body of foamed polymer has a thickness in the range of 0.5 mm to 35 mm.

16. An array of the roofing elements according to claim 1, disposed on a roof deck.

17. A process for preparing a roofing element according to claim 1, comprising:
providing a wet body of a foamed curable composition, the foamed curable composition being adapted to provide the foamed cured cross-linked polymer upon curing, the foamed curable composition having a wet foam density of about 0.1 to about 1.0 g/mL to provide a wet roofing element precursor;
disposing the granules on a top surface of the wet body of foamed curable composition; and then
allowing the wet body of foamed curable composition to cure to provide the body of foamed cured cross-linked polymer having the granules adhered to the top surface thereof.

18. A roofing element in the form of a roofing shingle, shake or tile extending substantially in a plane, the roofing element having a top surface, the roofing element comprising:
a body of a foamed cured cross-linked polymer, the body having a top surface at the top surface of the roofing element and a bottom surface, the body extending substantially in the plane, and
a layer of weather-resistant roofing granules disposed on and adhered at the top surface of the roofing element,
wherein the weather-resistant roofing granules are disposed directly on and partially embedded in a top surface of the body of the foamed cured cross-linked polymer,
wherein the roofing element has an asphalt content of less than about 5 wt %, and
wherein the roofing element passes the ASTM E-84 flame spray test,
wherein the body of foamed cured cross-linked polymer has a void volume, and wherein no more than 10% of the void volume is formed by foam cells having a longest dimension in excess of 100 microns.

19. The roofing element of claim 18, further comprising a support sheet disposed within the body of foamed cured cross-linked polymer.

20. The roofing element of claim 19, wherein the support sheet comprises roofing felt.

* * * * *